United States Patent
Sträter et al.

(10) Patent No.: US 6,378,829 B1
(45) Date of Patent: Apr. 30, 2002

(54) ARTICULATED BRACKET FOR OFFICE EQUIPMENT

(76) Inventors: Fritz Sträter, Auf den Breien 14, 58540 Valbert; Uwe Sträter, Unterm Bamberg 1, 58540 Meinerzhagen, both of (DE)

( * ) Notice: Subject to any disclaimer, the term of this patent is extended or adjusted under 35 U.S.C. 154(b) by 0 days.

(21) Appl. No.: 09/423,346
(22) PCT Filed: May 20, 1998
(86) PCT No.: PCT/EP98/02962
§ 371 Date: Nov. 22, 1999
§ 102(e) Date: Nov. 22, 1999
(87) PCT Pub. No.: WO98/53243
PCT Pub. Date: Nov. 26, 1998

(30) Foreign Application Priority Data

May 23, 1997 (DE) .......................................... 297 09 093

(51) Int. Cl.⁷ ................................................ E04G 3/00
(52) U.S. Cl. ............................. 248/276.1; 248/280.11; 248/283.1
(58) Field of Search .......................... 248/276.1, 280.4, 248/283.1, 292.13, 281.11, 282.1, 289.11, 123.11

(56) References Cited

U.S. PATENT DOCUMENTS

| | | | | |
|---|---|---|---|---|
| 3,820,752 A | | 6/1974 | Oram ........................... | 248/278 |
| 4,160,536 A | * | 7/1979 | Krogsrud ................... | 248/280.1 |
| 4,213,591 A | * | 7/1980 | Jaakkola ................... | 248/281.1 |
| 4,266,747 A | * | 5/1981 | Souder, Jr. et al. ....... | 248/280.1 |
| 4,545,555 A | | 10/1985 | Koch ......................... | 248/280.1 |
| 4,770,384 A | * | 9/1988 | Kuwazima et al. ....... | 248/281.1 |
| 4,852,842 A | * | 8/1989 | O'Neill ..................... | 248/280.1 |
| 4,987,690 A | * | 1/1991 | Aaldenberg et al. . | 248/281.1 X |
| 5,501,420 A | * | 3/1996 | Watt et al. ............... | 248/280.11 |
| 5,538,214 A | | 7/1996 | Sinila ....................... | 248/278.1 |

FOREIGN PATENT DOCUMENTS

| | | |
|---|---|---|
| CH | 675014 | 8/1990 |
| DE | 2402126 | 7/1975 |

* cited by examiner

Primary Examiner—Ramon O. Ramirez
Assistant Examiner—A. Joseph Wujciak
(74) Attorney, Agent, or Firm—Harness, Dickey & Pierce, P.L.C.

(57) ABSTRACT

The invention relates to an articulated bracket for supporting especially office equipment, such as screens, telephones and the like, in variable positions. The inventive bracket comprises a base part (2) which is secured in a fixed position, a lower bracket part (4) which is connected to said base part via a first joint (8) in such a way that it can pivot, and an upper bracket part (6) which is connected to said lower bracket part (4) via a second joint (10) in such a way that it too can pivot. Said upper bracket part (6) is connected to the base part (2) by means of a pull element (16), said pull element being guided via the joints (8, 10). Elastic means (18) are arranged in such a way that a carrying force (F) is produced to support the bracket parts (4, 6). Said elastic means (18) have two elastic elements (20, 22), a first elastic element (20) being located in the region of the lower bracket part (4) between said lower bracket part (4) and the pull element (16), and a second elastic element (22) being located in the region of the upper bracket part (6) between said upper bracket part and the pull element (16). Said pull element runs continuously between the base part (2) and the second joint (10).

17 Claims, 4 Drawing Sheets

ARTICULATED BRACKET FOR OFFICE EQUIPMENT

Figure 1:
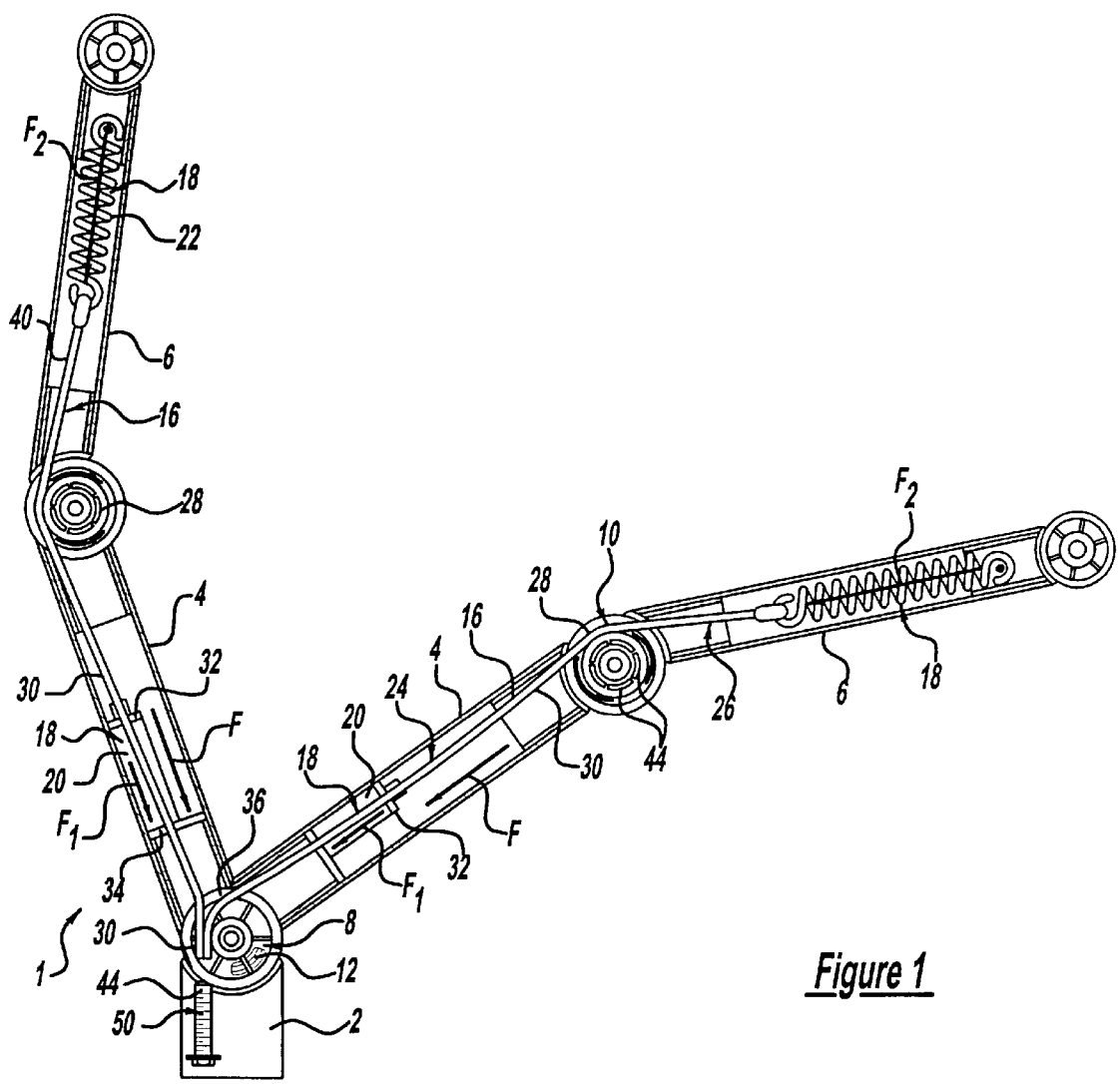

The present invention relates to an articulation arm for the variably positioned mounting in particular of office equipment, such as screens, telephones and the like, comprising a base part, which is to be fastened in a stationary manner, a bottom arm part, which is connected pivotably to the base part via a first articulation, and a top arm part, which is connected pivotably to the bottom arm part via a second articulation, it being the case that the top arm part is connected to the base part via a pull element which is guided over the articulations, and spring means are provided so as to produce a carrying force which supports the arm parts.

Such an articulation arm in the case of which, in order to compensate for different loading and lever lengths which depend on the respective spatial orientation of the articulation-arm parts, a pull cable is fixed in the base part, is guided over the first and second articulations and is fastened on the top arm part is known. Said pull cable is interrupted at one location, to be precise in the region of the bottom or of the top arm part, and is provided with a compensation spring here. In the case of said known articulation arm, the weight compensation is insufficient; at best, in the case of small loads, it is possible to achieve to a limited extent the situation where the arm parts remain static in any desired position.

The object of the present invention is thus to provide an articulation arm of the generic type in the case of which the weight compensation is improved such that, even in the case of loading with large loads, the arm parts are automatically retained statically in any desired position. Consequently, the articulation arm should also be suitable, in particular, for mounting heavy equipment, such as computer screens and the like.

This is achieved according to the invention in that the spring means have two spring elements, it being the case that a first spring element is arranged in the region of the bottom arm part, between the latter and the pull element, which runs continuously between the base part and the second articulation, and a second spring element is arranged in the region of the top arm part, between the latter and the pull element. This means that the first spring element is arranged in parallel with the pull element, while the second spring element is arranged in series with the pull element.

This configuration according to the invention first of all achieves the situation where it is possible to ensure a relatively high carrying force F as the sum of the individual forces $F_1+F_2$ of the two spring elements, it being possible for the spring elements, on account of the division, advantageously to be designed with a small and compact three-dimensional shape. This is advantageous, in particular, if the arm parts are designed as tubular, elongate hollow bodies and the spring elements are to be accommodated, together with the pull element, within the arm parts. This is because, in contrast to the spring division according to the invention, an individual spring element designed for a high carrying force would be of such a magnitude, in spatial terms, that interior accommodation would not be possible.

The invention also advantageously results in the two spring elements being connected in a force-fitting manner via the pull element, beyond the second articulation, such that—depending on the movement of the top and/or bottom arm part—they act individually or together. The important factor here in each case is the movement of the arm parts relative to the stationary base part, i.e. the respective alignment in space (alignment relative to the horizontal and vertical). In this respect, each arm part is specifically assigned one of the two spring elements. If, for example, the two arms are pivoted together in space, then the two spring elements act such that their prestressing force changes. With just one of the two arm parts pivoting, it is only the prestressing force of the associated spring element which changes. For example, only the bottom arm part can be pivoted, as a result of which the top arm part is merely shifted parallel in space. In this case, there is only a change in the prestressing force of the first spring element, which is assigned to the bottom arm part. The same applies when it is only the top arm part which is pivoted. The invention makes it possible for spring elements to be coordinated very precisely with the respective weight and leverage ratios of the two arm parts.

In an advantageous configuration of the invention, it is also possible using specific compensation means, which are explained in more detail hereinbelow, for an automatic, very precise compensation of the respectively effective, horizontally measured lever-arm lengths, which change during the pivot movements, to be achieved such that—in relation to each arm part—the carrying force produced by the respective spring element is always changed in dependence on the respective effective lever-arm length such that the articulation arm remains static in any desired position. Furthermore, it is even possible to achieve the situation where, even when the top arm part is pivoted out of an upwardly sloping spatial position, beyond the horizontal position, into a downwardly sloping position, the reshortening of the effective lever arm which occurs as a result is taken into account to the effect that, instead of a further increase in the carrying force, the force is increased to a less pronounced extent (degressively) or even is reduced again in accordance with the shortening effective lever arm.

In specific terms, this may advantageously be achieved in that the pull element is formed in two parts from a bottom pull part and a top pull part, it being the case that the two pull parts are connected in the region of the second articulation via a preferably disk-like deflecting element which can be rotated freely about the articulation axis. In this case, at least the top pull part is formed by a flexible pull cable which is fastened, on one side, on the deflecting element eccentrically to the articulation axis of the second articulation and, on the other side, on the top arm part indirectly via the second spring element. In order to vary the prestressing force of the second (top) spring element, the pull cable is guided, in the region of the second articulation, over a deflecting curve of the deflecting element. During the pivot movements, said deflecting curve has the pull cable wrapping around it to a more or less pronounced extent, as a result of which the prestressing force of the spring element is varied. According to the invention, it is thus possible, by a specific course of the radius of curvature, which may be designed to be constant or changing over the cable-deflecting path, to compensate for the change in the effective lever-arm length. The course of the deflecting curve may specifically be in the form of a section of a circle or helix.

The bottom pull part is also preferably designed as a pull cable and guided over a further deflecting curve of the freely rotatable deflecting element. It is advantageous here that the two deflecting curves may be designed in the same way or, in particular, differently. Thus, different radii of curvature which are constant or changing over the wrap-around path make it possible to realize virtually any desired kinematic step-up or step-down ratios, to be precise constant but also variable ratios (progressive/degressive).

Further advantageous configuration features of the invention can be gathered from the subclaims and from the following description.

Figure 2:
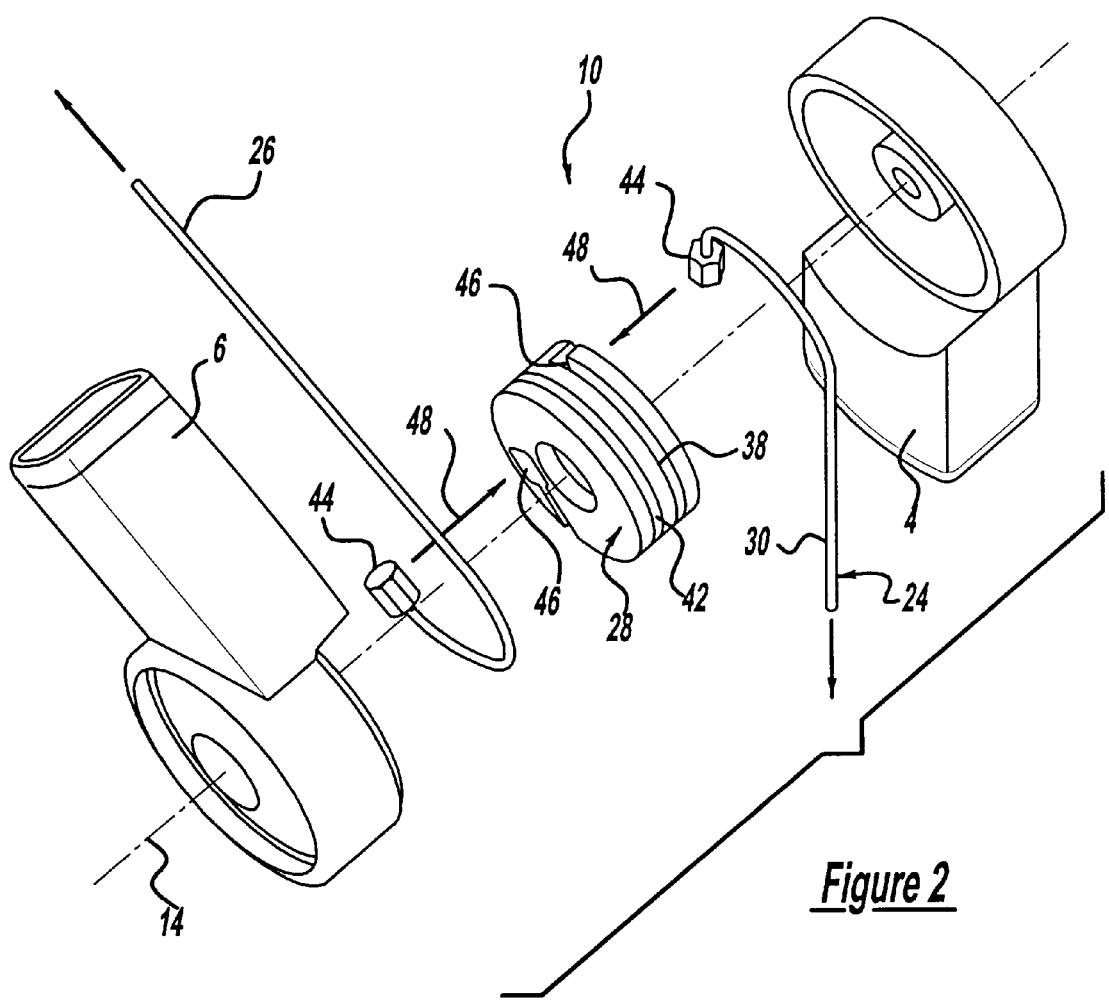
Figure 3:
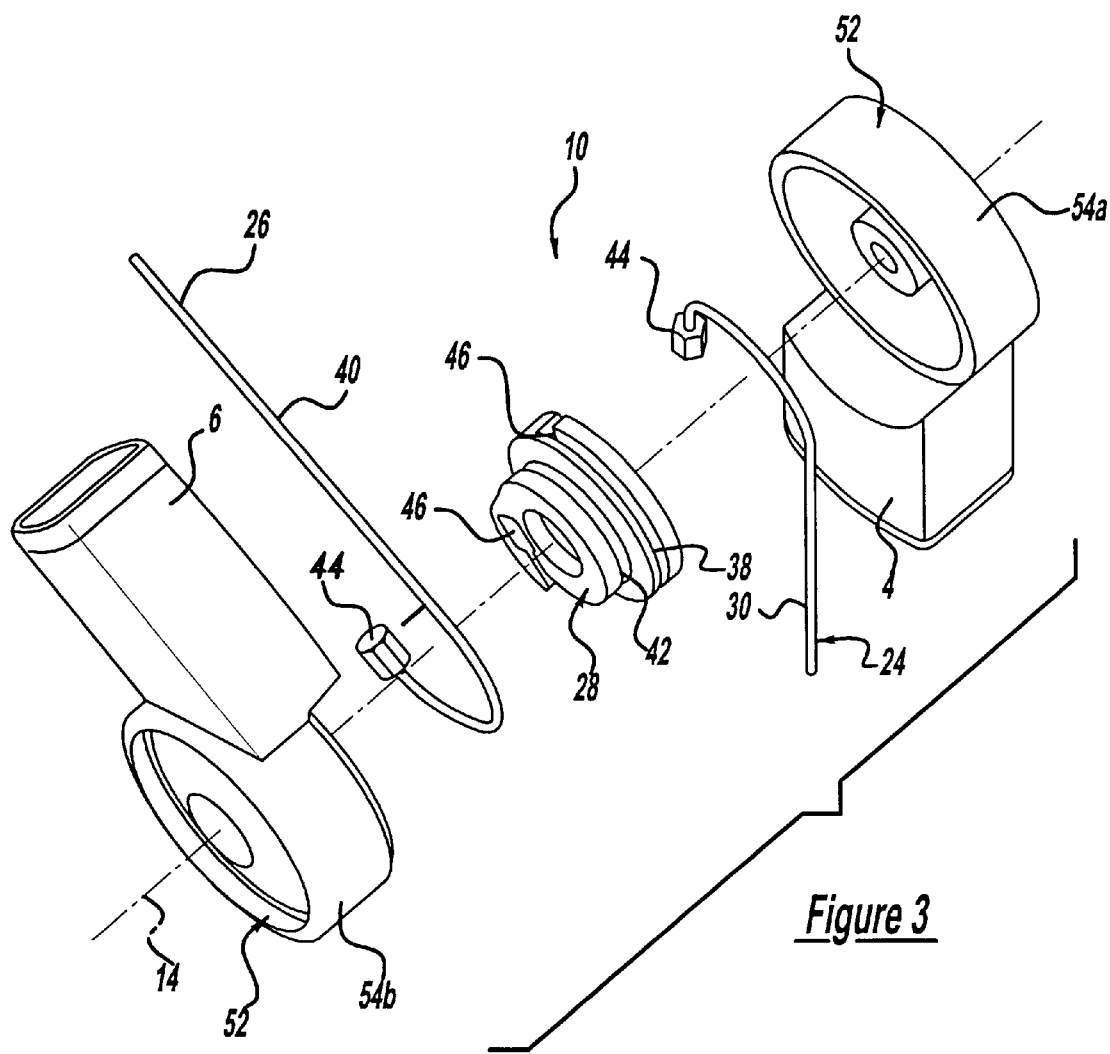
Figure 4:
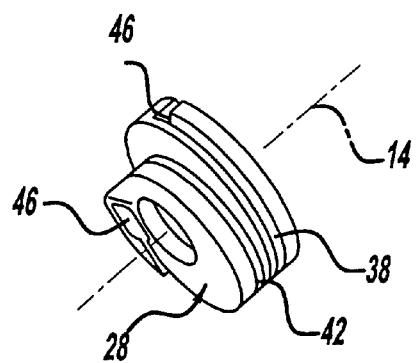
Figure 5:
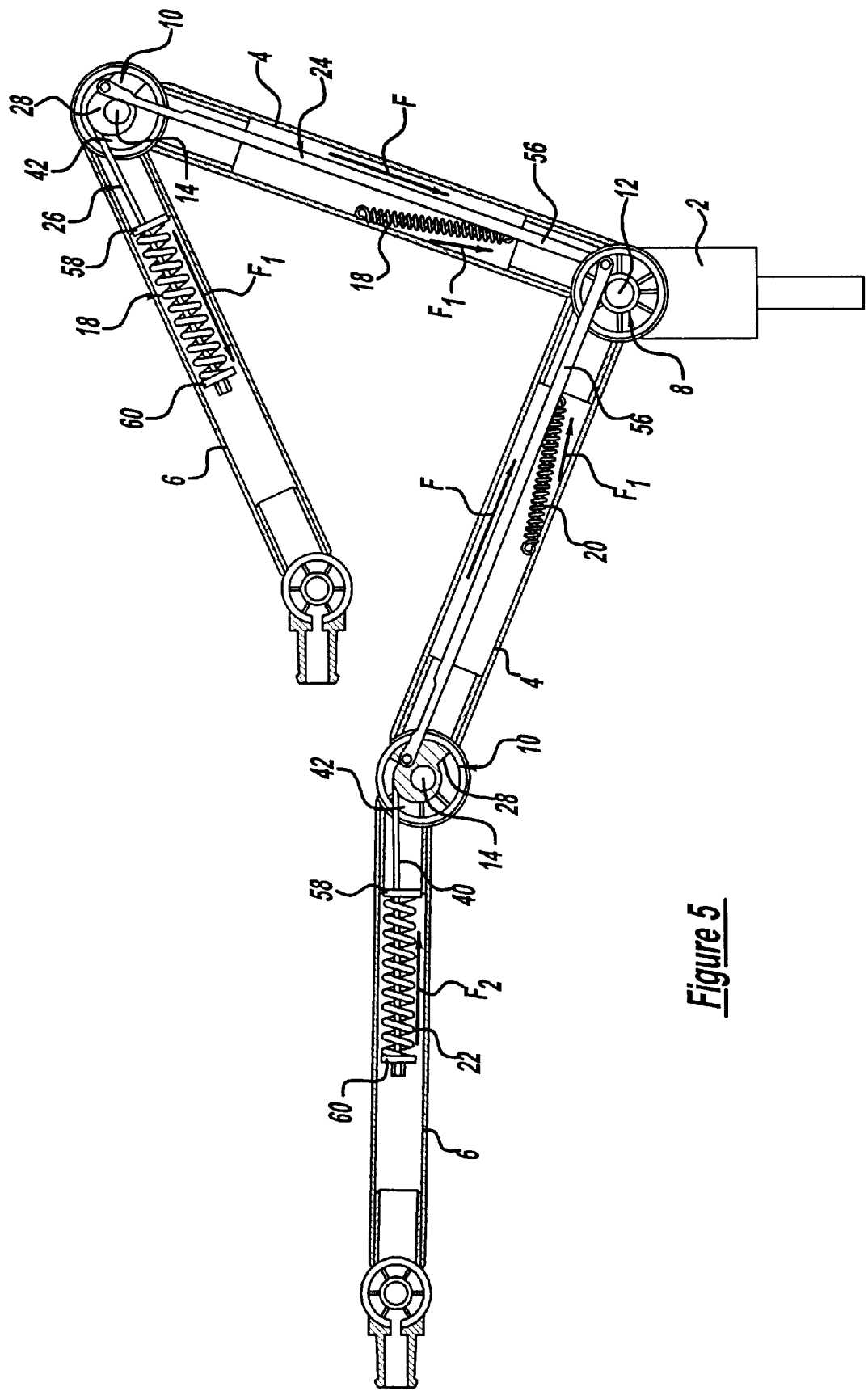

The invention is intended to be explained in more detail hereinbelow with reference to preferred exemplary embodiments illustrated in the drawing, in which:

FIG. 1 shows a longitudinally sectioned side view of a first embodiment of an articulation arm according to the invention, two different positions of the arm parts being illustrated, FIG. 2 shows a perspective exploded illustration of the second articulation, which connects the two arm parts, in a first embodiment corresponding to FIG. 1, FIG. 3 shows an illustration analogous to FIG. 2, but in a second embodiment, FIG. 4 shows a detail of the second articulation in a design variant, and FIG. 5 shows a longitudinally sectioned side view of a further embodiment of the articulation arm according to the invention, again in two different pivot positions of the arm parts.

The same parts are always provided with the same designations in the different figures of the drawing and are therefore usually only described once in each case.

As can be seen first of all from FIGS. 1 and 5, an articulation arm 1 according to the invention comprises a base part 2, which is to be fastened in a stationary manner on a desk for example, a bottom arm part 4 and a top arm part 6. The bottom arm part 4 is connected pivotably to the base part 2 via a first articulation 8. The two arm parts 4, 6 are connected pivotably to one another via a second articulation 10. The first articulation 8 defines a first articulation axis 12, and the second articulation 10 has a second articulation axis 14. These two articulation axes 12, 14 run parallel to one another and, with the intended fastening of the base part 2, approximately horizontally in space.

The top arm part 6 is connected to the stationary base part 2 via a pull element 16 which is guided over the articulations 10, 8, spring means 18 being provided so as to produce a carrying force F which supports the arm parts 4, 6.

According to the invention, the spring means 18 comprise two individual spring elements 20 and 22. A first spring element 20 is arranged in the region of the bottom arm part 4, between the latter and the pull element 16, such that it acts on the first arm part 4 with a spring force $F_1$ oriented in the direction of the base part 2, and thus supports said first arm part. A second spring element 22 is located in the region of the top arm part 6, between the latter and the pull element 16, the second spring element 22 likewise producing a supporting force $F_2$ oriented in the direction of the base part 2. The supporting force F which acts overall is thus the sum of the partial forces $F_1+F_2$.

In each case two different positions of the arm parts 4, 6 are illustrated by way of example in FIGS. 1 and 5. This makes it clear that pivoting of the two arm parts 4 and 6 results in a change in the two spring forces $F_1$ and $F_2$. According to FIG. 1, although the angle between the two arm parts 4, 6 has remained approximately constant, the top arm part 6 has also been pivoted relative to the base part 2 in terms of its spatial orientation. As a result, the two spring elements 20, 22 are changed in terms of their prestressing. If, in contrast, in each case just one of the two arm parts 4 or 6 is pivoted relative to the base part 2 in terms of its spatial orientation, then it is only the spring element 20 or 22 specifically assigned to it which varies in terms of its prestressing.

In the preferred embodiments of the invention, the pull element 16 is formed in two parts from a bottom pull part 24 and a top pull part 26. Said two pull parts 24, 26 are connected to one another in the region of the second articulation 10 via a preferably disk-like deflecting element 28 which can be rotated freely about the articulation axis 14.

In the embodiments according to FIGS. 1 to 4, the bottom pull part 24 is formed by a flexible pull cable 30 which is fastened, on one side, on the base part 2 eccentrically to the articulation axis 12 of the first articulation 8, and on the other side, on the deflecting element 28 eccentrically to the articulation axis 14 of the second articulation 10. In this case, the first spring element is designed by way of example as a compression spring and arranged, with prestressing, between a first abutment element 32, which is fastened on the pull cable 30, and a second abutment element 34, which forms a constituent part of the bottom arm part 4. The bottom pull part 24 or the pull cable 30 runs continuously here, i.e. uninterruptedly, between the base part 2 and the deflecting element 28. Via the continuous bottom pull part 24, the deflecting element 28 is always retained in the same rotary position relative to the base part 2 (parallel guidance). In the region of the first articulation 8, the pull cable 30 is guided over a deflecting curve 36 such that, during the pivot movements of the bottom arm part 4, the deflecting curve 36 has the pull cable 30 wrapping around it to a more or less pronounced extent. This achieves a variation of the spring force. Furthermore, the pull cable 30 is also guided, in the region of the second articulation 10, over a deflecting curve 38 of the deflecting element 28. For this purpose, you are referred, in particular, to the illustrations in FIGS. 2 to 4.

The top pull part 26 is also expediently formed by a flexible pull cable 40 which is fastened, on one side, on the deflecting element 28 eccentrically to the articulation axis 14 of the second articulation 10 and, on the other side, on the top arm part 6 indirectly via the second spring element 22. This pull cable 40 is also guided, in the region of the second articulation 10, over a (second) deflecting curve 42 of the deflecting element 28 (see, again, FIGS. 2 to 4 in particular).

In the case of the embodiments according to FIGS. 1 to 4, the deflecting element 28 thus has two deflecting curves 38 and 42 which are arranged in an offset manner one beside the other in the direction of the articulation axis 14. In the case of the design according to FIGS. 1 and 2, the two deflecting curves 38 and 42 are designed in the same way as circle-arc sections with the same radius of curvature. In this embodiment, a straightforward deflection, i.e. a 1:1 transmission, is thus achieved via the deflecting element 28.

In the case of the embodiment illustrated in FIG. 3, each deflecting curve 38, 42 is likewise designed as a circle-arc section, but the two deflecting curves 38 and 42 have different radii. In particular the deflecting curve 42, which is assigned to the top pull part 26, is designed with a smaller radius of curvature than the deflecting curve 38, which is assigned to the bottom pull part 24. This achieves stepping-up or stepping-down of kinematic movement. The transmission ratio is constant here over the pivoting range.

Finally, FIG. 4 illustrates a further design variant, in the case of which provision is made for the deflecting curve 42 in particular, which is assigned to the top pull part 26, to have a changing radius of curvature over the cable-deflecting path. In particular it is in the form of a section of a helix. This achieves a changing transmission ratio over the pivot path.

This thus forms compensation means which make it possible to compensate very precisely for the changes in the effective lever-arm lengths which occur during the pivot movements.

In this context, it may additionally be advantageous for the deflecting curve 36 of the base part also 2 to be designed with a constant or changing radius of curvature over the cable-deflecting path.

According to FIG. 1, the second (top) spring element 22 is designed as a tension spring and arranged, with prestressing, between the end of the pull cable 40 and a fastening point of the top arm part 6.

As can best be seen in FIGS. 2 and 3, each pull cable 30, 40 has, on the end side in each case, a connector piece 44 which is seated in a form-fitting manner in a receiving depression 46 of the deflecting element 28. The same also applies to the connection of the bottom pull cable 30 to the base part 2; see FIG. 1. This design ensures very straightforward installation, since all that is required is for the connector pieces 44 to be fitted into the receiving depressions 46. This is illustrated by way of example in FIG. 2 by depicted arrows 48.

FIG. 1 illustrates yet a further advantageous configuration, the pull element 16 or the bottom pull part 24 being connected to the base part 2 indirectly via a carrying-force adjustment device 50. As is illustrated, this may be an adjusting screw by means of which, via the pull element 16, it is possible to vary the carrying force F or the two partial forces $F_1$ and $F_2$.

The two arm parts 4, 6 are preferably designed as tubular, elongate hollow bodies, in particular with an approximately rectangular cross-sectional contour. In this case, the pull element 16 or the constituent parts thereof and the spring means 18 or the spring elements 20, 22 are encapsulated within the arm parts 4, 6. According to FIGS. 2 and 3, the arm parts 4, 6 form an articulation housing 52 in their connecting region, each arm part 4, 6 having a housing half-shell 54a and 54b, respectively. In the case of this embodiment, the lateral offset of the two deflecting curves 38, 42 of the deflecting element 28, and thus also the offset of the pull cables 30, 40, is advantageous because it is thus possible for the cables to be guided from the bottom arm part 4 into the top arm part 6 in an offset manner, thus allowing straightforward installation.

As far as the embodiment according to FIG. 5 is concerned, then, the latter corresponds very largely to the design according to FIG. 1. A brief explanation merely of the differences will thus be given hereinbelow. In the case of this design, the bottom pull part 24 is formed by a rigid pull rod 56 which is fastened, on one side, on the base part 2 in an articulated manner and eccentrically to the articulation axis 12 of the first articulation 8 and, on the other side, on the deflecting element 28 in an articulated manner and eccentrically to the articulation axis 14 of the second articulation 10. In this case, the first spring element 20 is designed as a tension spring and acts, at one end, on the pull rod 56 and, at the other end, on a fixed point of the bottom arm part 4. Here too, the bottom pull part 24 thus forms an uninterrupted connection between the base part 2 and the deflecting element 28 (parallel guidance). The second spring element 22 is designed here by way of example as a compression spring; it is seated between an abutment element 58 of the top arm part 6 and an abutment element 60, which is fastened at the end of the pull cable 40. Here too, the deflecting element 28 has the deflecting curve 42 for the top pull cable 40, the deflecting curve 42 in this case specifically extending from the fastening point of the pull cable 40 beyond the wrap-around path, having a decreasing radius of curvature, i.e. in particular a helical form. This achieves optimal compensation between the respective spring and lever forces. If, for example, the top arm part 6 is pivoted further downward out of its horizontal position, the spring force $F_1$ of the second spring element 22 would actually increase further. However, the configuration according to the invention means that the change in the spring force is neutralized by the specific deflecting curve 42, with the result that the weight compensation is optimum in each position and the articulation arm remains stable in each position.

Rather than being restricted to the exemplary embodiments described and illustrated, the invention also covers all equivalent embodiments within the scope of the invention. Thus, the spring elements 20, 22 may be formed by any desired combination of compression and/or tension springs. For example, as an alternative to the embodiments illustrated, it would be possible for the two spring elements to be designed as compression springs or for the two spring elements to be designed as tension springs. Furthermore, it is also possible to provide between the first and second articulations, for parallel guidance, a push rod instead of the bottom pull part, the only requirement then being for said push rod to be articulated on the other (bottom) side of the articulations in each case. Furthermore, rather than being restricted to the combination of features of claim 1, the invention may also be defined by any other desired combination of certain features of all the individual features as disclosed overall. This means that, in practice, virtually any individual feature of claim 1 can be left out or replaced by at least one individual feature disclosed at some other point of the application. In this respect, the claims are merely to be understood as a first formulation attempt.

What is claimed is:

1. An articulation arm for the variably positioned mounting of office equipment, comprising a base part (2), which is to be fastened in a stationary manner, a bottom arm part (4), pivotably connected to the base part (2) via a first articulation (8), and a top arm part (6), pivotably connected to the bottom arm part (4) via a second articulation (10), the top arm part (6) is connected to the base part (2) via a pull element (16), and spring means (18) comprising first and second spring elements (20,22) are provided so as to produce a carrying force (F) which supports the arm parts (4, 6), where the pull element (16) is guided over the two articulations (8, 10) eccentrically to the respective articulation axis (12, 14) and fastened on the base part (2), the first spring element (20) is arranged in the region of the bottom arm part (4), between the latter and the pull element (16), which runs continuously between the base part (2) and the second articulation (10), the first spring element thus being arranged in parallel with the pull element (16) and the second spring element (22) is arranged in the region of the top arm part (6), between the latter and the pull element (16), the second spring element thus being arranged in series with the pull element (16).

2. The articulation arm as claimed in claim 1, wherein the pull element (16) is formed in two parts from a bottom pull part (24) and a top pull part (26), it being the case that the two pull parts (24, 26) are connected in the region of the second articulation (10) via a deflecting element (28) which can be rotated freely about the articulation axis (14).

3. The articulation arm as claimed in claim 2, wherein the bottom pull part (24) is formed by a flexible pull cable (30) which is fastened, on one side, on the base part (2) eccentrically to the articulation axis (12) of the first articulation (8) and, on the other side, on the deflecting element (28) eccentrically to the articulation axis (14) of the second articulation (10).

4. The articulation arm as claimed in claim 3, wherein the pull cable (30) is guided, in the region of the first articulation (8), over a deflecting curve (36) of the base part (2) and therefor, in the region of the second articulation (10), over a deflecting curve (38) of the deflecting element (28).

5. The articulation arm as claimed in claim 4, wherein the deflecting curve (36) of the base part (2) has a constant radius of curvature over the cable-deflecting path.

6. The articulation arm as claimed in claim 4, wherein the deflecting curve (36) of the base part (2) has a changing radius of curvature over the cable-deflecting path.

7. The articulation arm as claimed in claim 2, wherein the bottom pull part (24) is formed by a rigid pull rod (56) which is fastened, on one side, on the base part (2) in an articulated manner and eccentrically to the articulation axis (12) of the first articulation (8) and, on the other side, on the deflecting element (28) in an articulated manner and eccentrically to the articulation axis (14) of the second articulation (10).

8. The articulation arm as claimed in claim 2, wherein the top pull part (26) is formed by a flexible pull cable (40) which is fasted, on one side, on the deflecting element (28) eccentrically to the articulation axis (14) of the second articulation (10) and, on the other side, on the top arm part (6) indirectly via the second spring clement (22).

9. The articulation arm as claimed in claim 8, wherein the pull cable (40) is guided, in the region of the second articulation (10), over a deflecting curve (42) of the deflecting element (28).

10. The articulation arm as claimed in claim 9, wherein the two deflecting curves (38, 42) assigned to the pull cables (30, 40) are arranged in an offset manner in the direction of the articulation axis (14).

11. The articulation arm as claimed in claim 10, wherein the two deflecting curves (38, 42) are designed having a constant radii of curvature over the cable-deflecting path.

12. The articulation arm as claimed in claim 10, wherein the deflecting curve (38), which is assigned to the bottom pull cable (30), and the deflecting curve (42), which is assigned to the top pull cable (40), have a changing radius of curvature over the cable-deflecting path.

13. The articulation arm as claimed in claim 8, wherein one of the pull cable (30) and the pull cable (40) has, on an end side, a connector piece (44) which is seated in a form-fitting manner in a receiving depression (46) of the corresponding part (2; 28) connected to said cable end.

14. The articulation arm as claimed in claim 1, wherein the spring elements (20, 22) are designed as one of compression and tension springs.

15. The articulation arm as claimed in claim 1, wherein the pull element (16) is connected to the base part (2) indirectly via a carrying-force adjustment device (50).

16. The articulation arm as claimed in claim 1, wherein the arm parts (4, 6) are each designed as tubular hollow bodies with preferably an approximately rectangular cross-sectional contour, the pull element (16) and spring means (18) being arranged within the arm parts (4, 6).

17. The articulation arm as claimed in claim 1, wherein the arm parts (4, 6) form an articulation housing (52) in their connecting region, each arm part (4, 6) having a housing half-shell (54a,b).

* * * * *